United States Patent [19]

Lipner et al.

[11] Patent Number: 5,121,318
[45] Date of Patent: Jun. 9, 1992

[54] ON-LINE PLANT OPERATING PROCEDURE GUIDANCE SYSTEM

[75] Inventors: Melvin H. Lipner, Monroeville; David A. Reed, Plum Borough; Steven D. Whaley, Monroeville, all of Pa.

[73] Assignee: Westinghouse Electric Corp., Pittsburgh, Pa.

[21] Appl. No.: 340,197

[22] Filed: Apr. 19, 1989

[51] Int. Cl.⁵ .................... G05B 11/01; G01B 7/54; G21C 7/36
[52] U.S. Cl. .................... 364/146; 364/188; 364/550; 376/216
[58] Field of Search ............... 364/518, 521, 146, 550, 364/551.01, 494, 431.01, 188, 138, 184; 376/216, 217, 218, 245, 249

[56] References Cited

U.S. PATENT DOCUMENTS

| | | | |
|---|---|---|---|
| 4,488,258 | 12/1984 | Struger et al. | 364/146 |
| 4,628,444 | 12/1986 | Nozawa et al. | 364/188 |
| 4,632,802 | 12/1986 | Herbst et al. | 364/184 |
| 4,658,348 | 4/1987 | Flanagan et al. | 364/146 |
| 4,704,676 | 11/1987 | Flanagan et al. | 364/146 |
| 4,792,888 | 12/1988 | Agarwal et al. | 364/188 |
| 4,803,039 | 2/1989 | Impink, Jr. et al. | 376/216 |
| 4,823,283 | 4/1989 | Diehm et al. | 364/518 |
| 4,853,175 | 8/1989 | Book, Sr. | 364/138 |
| 4,862,345 | 8/1989 | Lekron | 364/188 |
| 4,873,623 | 10/1989 | Lane et al. | 364/188 |
| 4,899,292 | 2/1990 | Montagna et al. | 364/521 |
| 4,941,113 | 7/1990 | Dundics et al. | 364/551.01 |

Primary Examiner—Jerry Smith
Assistant Examiner—Jim Trammell

[57] ABSTRACT

A method of displaying data corresponding to a procedure is provided where all of the data required to follow the procedure is displayed together with abbreviated text corresponding to the procedure. Text and data corresponding to only a portion of the procedure is displayed at any given time. Additional information related to several consecutive steps of the procedure which appear on separate screens is displayed continuously to one side of the screen. Additional data may be selected to displayed prior to returning to the original screen.

18 Claims, 2 Drawing Sheets

ON-LINE PLANT OPERATING PROCEDURE GUIDANCE SYSTEM

BACKGROUND OF THE INVENTION

1. Field of the Invention

This invention is related to a method of displaying data related to a procedure for operating a complex facility and, more particularly, to an on-line system for displaying data associated with emergency response procedures for operating a nuclear reactor.

2. Description of the Related Art

There are many different types of systems for displaying procedures or data related to procedures for operating a complex facility. For example, there are systems which are the equivalent of an "electronic book" where procedures for operating the facility have been entered into computer readable form for access by an operator of the facility. Such systems may provide for easier access to a required procedure by including an electronic index, but otherwise provide little advantage over printed procedures. On the other hand, there are much more sophisticated systems such as the one described in U.S. patent application Ser. No. 825,427, filed Feb. 3, 1986, incorporated herein by reference. The system described therein provides on-line interactive monitoring of the execution of process operating procedures. Critical plant data is monitored and evaluated by comparison with predetermined thresholds and in accordance with the prescribed operating procedures. The system selects items of concern for display to the operator of the facility. The text of the procedures is displayed as necessary.

The control room of a complex facility can include numerous gauges, meters and other forms of display of operational status of the facility. Textual procedures, whether stored electronically or not, do little more than instruct an operator which of the many forms of data display need to be checked. On the other hand, the on-line monitoring system described in the '427 application provides only the information which is determined by the system to be of concern to the operator. Other data which may confirm or contradict the accuracy of the data relied upon by the monitoring system is not provided. Thus, an operator may still need to check other devices displaying operational status information.

SUMMARY OF THE INVENTION

An object of the present invention is to provide a method for supplying all information required to follow predetermined procedures for operating a complex facility.

Another object of the present invention is to provide access to additional data related to displayed data corresponding to a portion of a procedure for operating a complex facility.

The above objects are attained by providing a method of displaying data related to a procedure for operating a complex facility, comprising the steps of receiving equipment data indicating operational status of equipment in the complex facility; displaying text corresponding to a portion of the procedure for operating the complex facility; and displaying, simultaneously with the text, all items of the equipment data related to the portion of the procedure. The equipment data is displayed based solely upon a fixed relationship to the portion of the procedure, regardless of whether any portion of the complex facility is operating abnormally. Additional data may also be displayed throughout a sequence of consecutive steps in the procedure. Also, additional data may be requested for display by specifying a location on a display screen corresponding to an item of the displayed data.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

While the display techniques of the present invention can be applied to many different situations, a description will be given of the present invention applied to emergency operating procedures of a nuclear reactor. Since these procedures are used only after an emergency has arisen, it will be assumed that an alarm situation already exists. The process of initiating the display routines described below may be automatic or manual. The present invention is not limited to the described application, but could be used continuously during operation of a complex facility, assuming written procedures exist for the operation of the facility. The Nuclear Regulatory Commission (NRC) requires written emergency operating procedures for nuclear power plants and the process of producing such procedures is not included within the scope of the present invention. Rather, it will be assumed that such procedures already exist.

As noted above, one of the primary objectives of the present invention is to collect 10 all of the data required by one or more steps of a procedure and display the data together with text 12 corresponding to the procedure. Since the procedures are ordinarily written in sentences and the amount of display space available is limited, typically the displayed text will include abbreviations and often incomplete sentences. The function of the displayed text is to identify the corresponding step in the written procedure.

Figure 2:
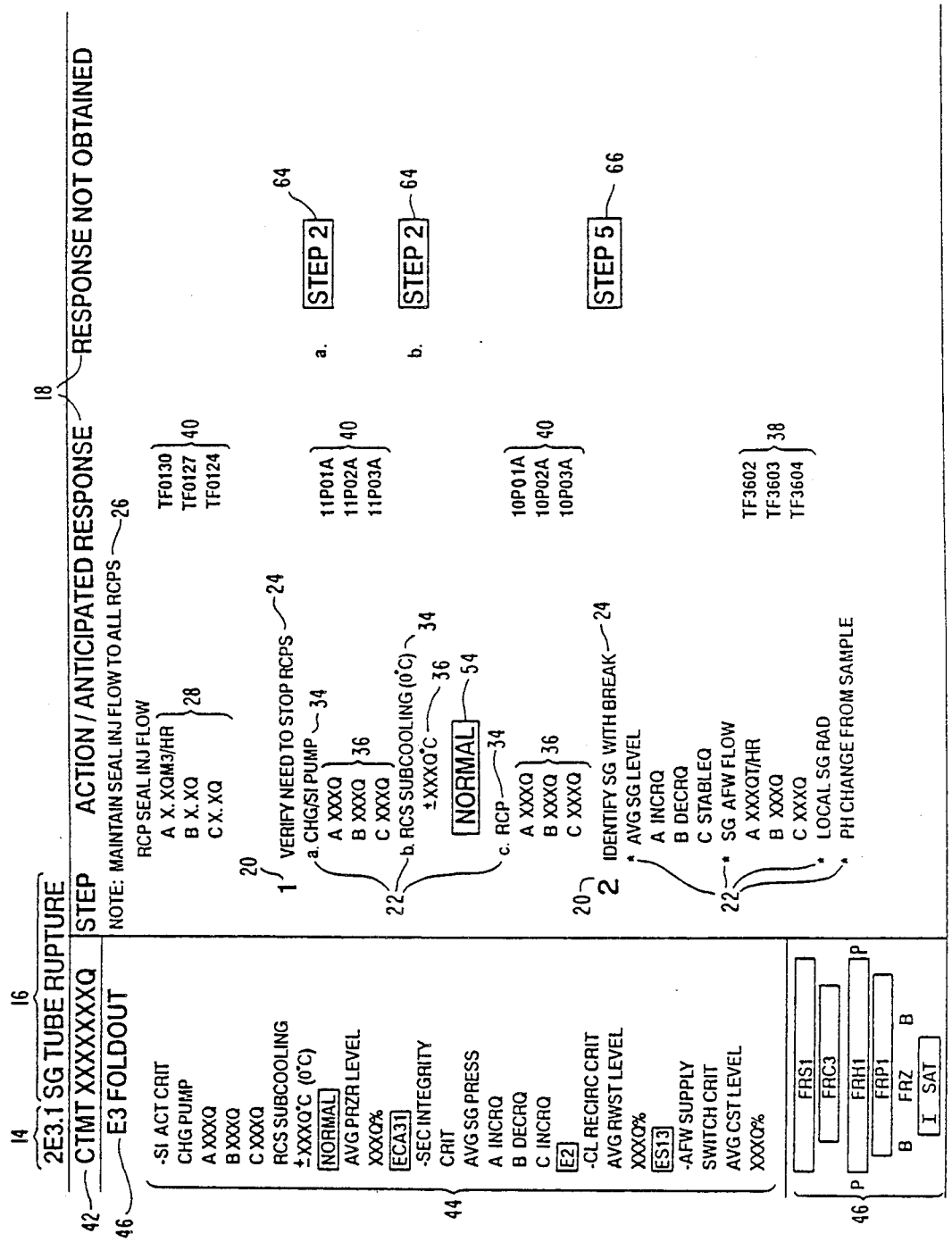
FIG. 2 is an example of a display produced by a method according to the present invention.

In the preferred embodiment, a correspondence between the text and data displayed on the screen and the written procedure is established in several ways. First, the name of the procedure, including both identifying a number 14 and abbreviated text description 16, is preferably displayed at the top of the display screen as illustrated in FIG. 2. Preferably, the display screen is a color monitor, such as a high resolution Hitachi monitor connected to an SUN workstation.

Continuing with reference to FIG. 2, the majority of the screen is set aside for abbreviated portions of the procedure and related data. The first line is a heading line 18 identifying three columns, STEP, ACTION/ANTICIPATED RESPONSE and RESPONSE NOT OBTAINED. As indicated by the heading 18 and the numerals 20 indicating step number in the first column, FIG. 2 is an illustration of the first two steps in procedure E3 and both of the steps include sub-steps 22.

Figure 1:
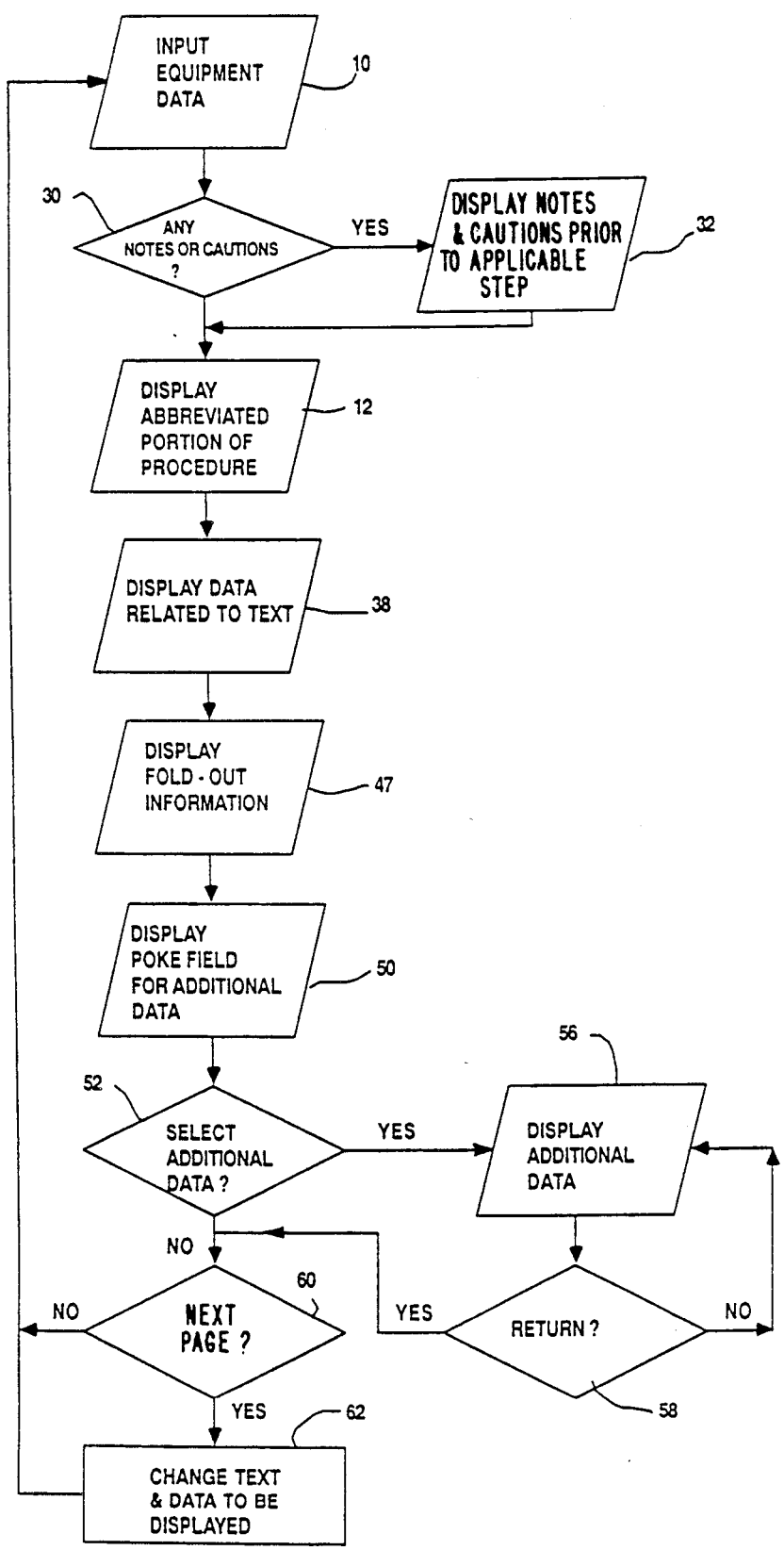
FIG. 1 is a flowchart of the method according to the present invention.

On the same line as the numerals 20 of the step number appears the abbreviated text 24 which is displayed in step 12 of the flowchart illustrated in FIG. 1.

Between the heading 18 and step description 20, 24 of step 1 appears a note 26 and related data 28. As indicated in the flowchart of FIG. 1, if 30 there are any notes or cautions, the notes and cautions are displayed 32 immediately prior to the sequence of consecutive steps in the procedure to which they apply. More details regarding the notes and cautions 26 and related data 28 will be described below. Notes and cautions are additional items which the operator must monitor during progress through the sequential procedure steps.

The sub-steps 22 in the steps each have associated text 34 identifying the related data 36 which is displayed 38 (FIG. 1) simultaneously with the text displayed in step 12. Taking as an example sub-step a of step 1 in procedure E3, the identification text 34 indicates that the related data 36 contains information about charging safety injection pumps. Each of the items of data identified by sub-step letters 22 include equipment data which may be textual, such as ON or OFF, or numerical, as in the case of sub-step b, which is a temperature. The letter "Q" in the equipment data 36 represents a code indicating the quality of the data represented by the X's. For example, the letter B may be used to indicate that the data is believed to be bad or the letter P may be used to indicate that the data may be poor. Either in addition or as an alternative, different colors may be used to display data which is suspect. In addition to the textual identification 34 of the data 36, plant equipment identification numbers 40 are included to specify for which, e.g., pump, data is being displayed.

The other portions of the display illustrated on the left-hand side of FIG. 2 include an indication of containment status 42, fold-out information 44 and alert bars 46. Although positioned slightly differently, the containment status 42 and alert bars 46 perform a function similar to that described in the '427 application. The fold-out information 44, on the other hand, provides a considerable amount of equipment data in a condensed format. Like the notes and cautions 26 and related data 28, the fold-out information 44 comprises a set of additional items of equipment data, commonly related to an entire procedure. Unlike the notes and cautions 26 and related data 28, the fold-out data 44 is displayed 47 throughout the displaying of the text corresponding to the sequence of consecutive steps.

As indicated by the fold-out header 46, the information in the fold-out portion 44 illustrated in FIG. 2 corresponds to the E3 procedure and will continue to be displayed for all of the steps included therein. The use of abbreviated textual descriptions combined with textual or numerical data in the fold-out portion 44 is similar to that described above for the procedural text 34 and related items of data 36. In the case of languages reading from left to right, it is preferred that the fold-out data 44 be positioned on the left as illustrated, because when the data changes, the operator needs to become aware of the change and it is more likely to be noticed there. If the operator is accustomed to read from right to left, the fold-out data 44 may be moved to the right.

It should be noted that in both portions all uses of "X" and "Q" represent data which is input 10 from sensors monitoring the equipment, while most of the other text is fixed by the procedure associated with the display. The exceptions are the text surrounded by rectangular boxes and "INCR" and "DECR" immediately preceding "Q" which in this example represent that levels of pressures are increasing or decreasing, respectively. While the values represented by the X's will change depending upon the inputs received, the number of lines, i.e., the number of items of data which are displayed, is determined solely by a fixed relationship to the portion of the procedure corresponding to the display. In particular, the number of items of equipment data which are displayed does not change if any portion of the complex facility is operating abnormally. Only the values, or colors used to display the data will change.

Due to the large amount of data which is available and needs to be considered by the operator, access is provided to additional items of the equipment data via the fields enclosed by rectangular boxes. On an actual display screen, these boxes would appear using a unique characteristic of the display, such as reverse video or different background color inside of the rectangular box than on the rest of the screen. These fields provide poke fields which are displayed 50 so that the additional data can be selected 52. For example, in sub-step b of step 1, the RCS subcooling has an indication 54 of NORMAL. If the operator desires additional information regarding the basis for this characterization of the RCS subcooling, beyond that of the temperature, a selection can be made at the location corresponding to the display of NORMAL 54 to cause the display 56 of additional data. This selection of data may be performed using, e.g., a touch screen or a light pen, etc. Alternatively, a mouse or other cursor maneuvering device may be used to position a cursor in the field and a button pressed to indicate selection of the specified field, which is equivalent to contacting the screen at the corresponding location.

The type of information which may be obtained as additional information is not limited to simple expansion of the displayed data as described above. In addition, diverse information verifying the accuracy of displayed information may be made available. For example, the equipment data 36 below step 1a of procedure E3 may be derived from sensors on three pumps indicating whether the pumps are operating. A system according to the present invention may provide access to additional data on flow meters, or other pumps and valves in the network connected to one of the safety injection pumps. Thus, if the displayed equipment data 36 indicates that a pump is running and efforts to turn off the pump do not change the displayed data, additional data describing flow in the piping network connected to the pump can be checked to determine whether there is any actual flow or whether the sensor has failed in such a way that the sensor continuously outputs an indication that the pump is operating, even though the pump has been successfully turned off.

The additional data may be displayed 56 in the form of one or more graphs. In addition, several types of data are evaluated in light of historical data. Therefore, the additional data may have been generated by storing at least a portion of the equipment data over a period of time as historical data so that the historical data can be displayed, e.g., using graphs, when a specified item on the existing display, corresponding to a summary of the additional data, is selected 52. After an operator has completed viewing the additional data, the display is returned 58 to the previous screen in a conventional manner.

As the operator of the complex facility performs the procedure corresponding to the displayed text 24, subsequent steps can be displayed by scrolling 60, 62 a line or a page at a time in a conventional manner, as illustrated in FIG. 1. In the case of a display screen like that illustrated in FIG. 2, the note 26 and data 28 related thereto will be included in the text and data scrolled off the screen. However, the operator is preferably provided with a method for returning directly to the note or caution 26 by providing a control indication, such as specifying a poke field on a subsequent screen or otherwise identifying the screen of data containing the note 26 which is desired to be viewed.

During the course of performing a procedure, the anticipated response is not always obtained. Typically, procedures for operating a complex facility allow for such an occurrence by providing instructions for how to proceed if the anticipated response is not obtained. This is the purpose of the third column of the procedural portion illustrated in FIG. 2. The poke fields 64, 66 illustrated in FIG. 2 provide for moving directly to the appropriate step if the anticipated response is not obtained. As illustrated, even when the step specified by the procedure is already on the screen, as in the case of poke fields 64, the poke fields are still provided to maintain consistency and simplify use by the operator. If the operator selects poke field 66, the procedural portion of the display illustrated in FIG. 2 will completely change so that at least the first portion of step 5 will be displayed together with the heading 18.

The many features and advantages of the present invention are apparent from the detailed specification and thus, it is intended by the appended claims to cover all such features and advantages of the method which fall within the true spirit and scope of the invention. Further, since numerous modifications and changes will readily occur to those skilled in the art it is not desired to limit the invention to the exact construction and operation illustrated and described. For example, in an application where all of the information required by a procedure is not input in step 10, an instruction may be displayed to obtain additional information from another source. Accordingly, all suitable modifications and equivalents may be resorted to falling within the scope and spirit of the invention.

What is claimed is:

1. A method of displaying data related to a procedure for operating a complex facility, comprising the steps of:
    (a) receiving equipment data indicating operational status of equipment in the complex facility;
    (b) displaying text corresponding to a portion of the procedure for operating the complex facility; and
    (c) displaying, simultaneously with the text in step (b), the equipment data received in step (a) and having a fixed relationship to the portion of the procedure.

2. A method as recited in claim 1, wherein the equipment data displayed in step (c) is displayed regardless of whether the complex facility is operating in a critical range.

3. A method as recited in claim 2, further comprising the steps of:
    (d) providing access, via a selection indication provided by a human operator, to additional items of the equipment data; and
    (e) displaying selected additional items of equipment data in response to the selection indication.

4. A method as recited in claim 3, wherein step (e) comprises displaying the selected additional items of equipment data using a graph.

5. A method as recited in claim 4,
    further comprising the step of (f) storing at least a portion of the equipment data over a period of time greater than one day as historical data,
    wherein step (d) comprises providing access to the historical data, and
    wherein step (e) comprises displaying selected items of the historical data in response to the selection indication.

6. A method as recited in claim 2, further comprising the step of (d) displaying a first set of additional items of the equipment data, commonly related to a sequence of consecutive steps in the procedure, throughout said displaying of the text corresponding to the sequence of consecutive steps in step (b).

7. A method as recited in claim 6, further comprising the steps of:
    (e) providing access, via a selection indication, to a second set of additional items of the equipment data; and
    (f) displaying selected additional items from the second set of additional items of the equipment data in response to the selection indication.

8. A method as recited in claim 7, wherein the first and second sets of additional data are related.

9. A method as recited in claim 8,
    wherein said displaying in steps (b), (c) (f) are performed using a screen, and
    wherein said method further comprises the step of (g) inputting the selection indication by effectively making contact with the screen substantially at a location corresponding to the display of at least one item in the first set of the additional items of the equipment data.

10. A method as recited in claim 9, wherein the at least one item provides a summary of the first set of the additional items of equipment data.

11. A method as recited in claim 6, further comprising the step of (e) displaying a second set of additional items of the equipment data, immediately prior to said displaying in step (b) of a sub-set of the sequence of consecutive steps in the procedure, the sub-set being commonly related to the second set of additional items of the equipment data.

12. A method as recited in claim 11, further comprising the steps of:
    (f) scrolling, in response to a first control indication, the text displayed in step (b) and the items related thereto, displayed in step (c), to display text corresponding to a different portion of the procedure, the second set of additional items of the equipment data scrolling off with the beginning of the sub-set of the sequence of consecutive steps; and
    (g) returning, in response to a second control indication, directly to the second set of additional items of the equipment for display thereof.

13. A method as recited in claim 2, further comprising the step of (d) displaying a diagram of the complex facility in response to a control indication.

14. A method as recited in claim 2, further comprising the step of (d) displaying an instruction to obtain additional information from another source when the additional information is required to perform the portion of the procedure and the additional information is not included in the equipment data.

15. An apparatus for displaying data related to a procedure for operating a complex facility, comprising:
- data acquisition means for receiving equipment data indicating operational status of equipment in the complex facility; and
- display means for displaying text corresponding to a portion of the procedure for operating the complex facility and for simultaneously displaying the equipment data received by said data acquisition means and having a fixed relationship to the portion of the procedure regardless of whether the complex facility is operating in a critical range.

16. An apparatus as recited in claim 15,
- further comprising access means for providing access, via a selection indication provided by a human operator, to additional items of the equipment data, and
- wherein said display means displays selected additional items of equipment data in response to the selection indication.

17. An apparatus as recited in claim 16,
- further comprising storage means for storing at least a portion of the equipment data over a period of time greater than one day as historical data,
- wherein said access means provides access to the historical data, and
- wherein said display means displays selected items of the historical data in response to the selection indication.

18. An apparatus as recited in claim 15, wherein said display means displays a first set of additional items of the equipment data, commonly related to a sequence of consecutive steps in the procedure, while the text corresponding to the sequence of consecutive steps is displayed, and displays a second set of additional items of the equipment data immediately prior to a sub-set of the sequence of consecutive steps in the procedure, the sub-set being related to the second set of additional items of the equipment data.

* * * * *